US008958458B2

(12) United States Patent
Bouvier Des Noes (10) Patent No.: US 8,958,458 B2
(45) Date of Patent: Feb. 17, 2015

(54) METHOD FOR BLIND ESTIMATION OF A SCRAMBLING CODE FOR A CDMA 2000 UPLINK

(71) Applicant: Commissariat a l'Energie Atomique et aux Ene Alt, Paris (FR)

(72) Inventor: Mathieu Bouvier Des Noes, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 96 days.

(21) Appl. No.: 13/792,726

(22) Filed: Mar. 11, 2013

(65) Prior Publication Data

US 2013/0244642 A1  Sep. 19, 2013

(30) Foreign Application Priority Data

Mar. 15, 2012 (FR) ...................... 12 52340

(51) Int. Cl.
| H04B 1/00 | (2006.01) |
| H04B 15/00 | (2006.01) |
| H04B 1/7073 | (2011.01) |
| H04L 1/00 | (2006.01) |

(52) U.S. Cl.
CPC ............ *H04B 15/00* (2013.01); *H04B 1/70735* (2013.01); *H04L 1/005* (2013.01); *H04L 1/0054* (2013.01); *H04L 2001/0092* (2013.01)
USPC ........................................................ 375/146

(58) Field of Classification Search
CPC ... H04L 1/005; H04L 1/0054; H04L 25/0202; H04L 25/0226; H04B 1/70735; H04B 15/00; H04B 1/7097
USPC .............................. 375/146; 455/450; 370/476
See application file for complete search history.

(56) References Cited

U.S. PATENT DOCUMENTS

| 8,223,743 | B2* | 7/2012 | Guvenc et al. ................ 370/350 |
| 2003/0223398 | A1* | 12/2003 | Haim et al. ................... 370/342 |
| 2007/0206638 | A1 | 9/2007 | Santoru et al. | |
| 2011/0081915 | A1* | 4/2011 | Maida et al. .................. 455/450 |

FOREIGN PATENT DOCUMENTS

WO   WO 2008/049713 A1   5/2008

OTHER PUBLICATIONS

Search Report issued Mar. 22, 2013 in European Patent Application No. EP 13 15 8690 (with English Translation of Category of Cited Documents).

(Continued)

*Primary Examiner* — Shuwang Liu
*Assistant Examiner* — Helene Tayong
(74) *Attorney, Agent, or Firm* — Oblon, Spivak, McClelland, Maier & Neustadt, L.L.P.

(57) ABSTRACT

A method for estimating a scrambling code used on the uplink of a CDMA 2000 system. The received signal is firstly sampled at twice the chip frequency of the spreading code, and then filtered with a filter adapted to the spreading code and to pulse shaping. Differential processing of the successive samples is applied on the signal thus filtered and the differential values thus obtained are decoded using iterative belief propagation decoding. The decoded values are then used to determine the content of the shift register of the scrambling code generator at a given instant.

7 Claims, 6 Drawing Sheets

(56) References Cited

OTHER PUBLICATIONS

Reza Moosavi, et al., "A Fast Scheme for Blind Identification of Channel Codes", Global Telecommunications Conference (GLOBECOM 2011), XP032118709, 2011 IEEE, Dec. 5, 2011, pp. 1-5.

Keith M. Chugg, et al., "A New Approach to Rapid PN Code Acquisition Using Iterative Message Passing Techniques", IEEE Journal of Selected Areas in Communications vol. 23. No. 5, May 2005, pp. 884-897.

B. Arazi, "Decimation of $m$-Sequences Leading to any Desired Phase Shift", Electronics Letters, Mar. 1977, vol. 13, No. 7, pp. 213-215.

U.S. Appl. No. 13/792,645, filed Mar. 11, 2013, Bouvier Des Noes.

* cited by examiner

*BACKGROUND ART*

METHOD FOR BLIND ESTIMATION OF A SCRAMBLING CODE FOR A CDMA 2000 UPLINK

TECHNICAL FIELD

This invention relates to the field of mobile telecommunications and more particularly to the reduction of interference in a femtocell network.

STATE OF PRIOR ART

Communications in a femtocell network may be affected by interference generated by communications from an adjacent macrocell.

Figure 1:
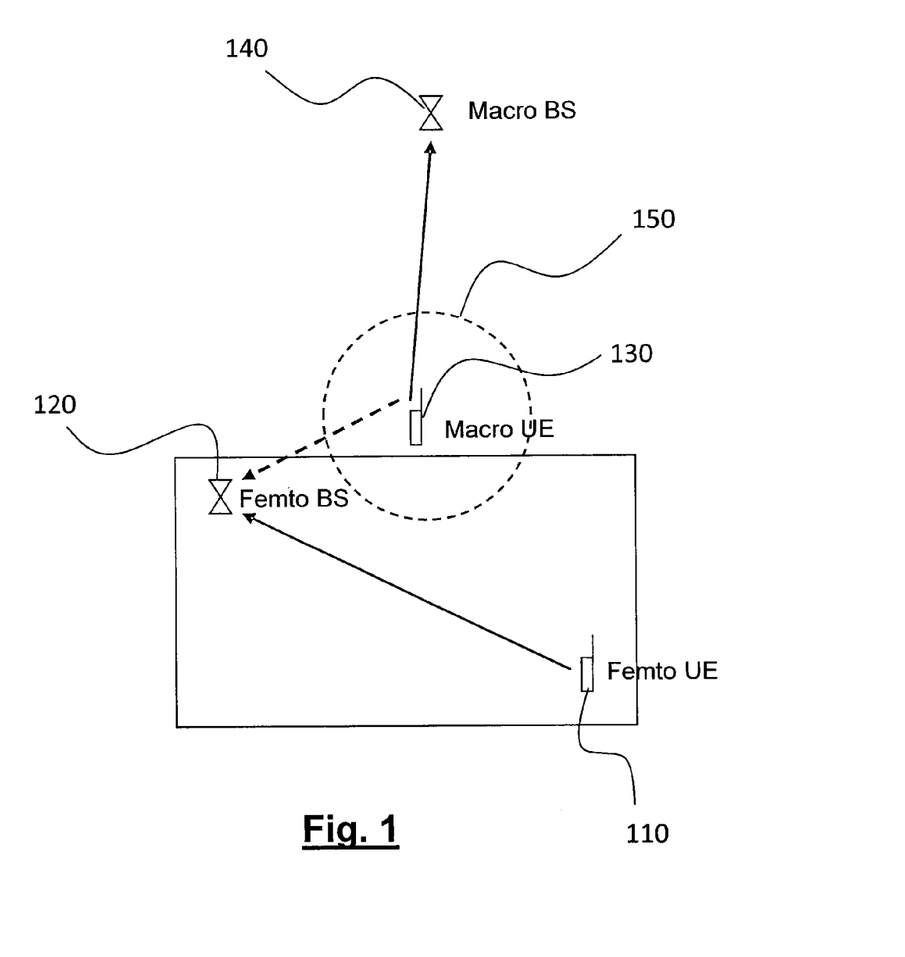
FIG. 1, already described, shows a situation in which there is interference between a femtocell and a macrocell.

FIG. 1 shows a conventional interference scenario between a terminal 110 attached to a femtocell ("Femto UE"), and a terminal 130 attached to a macrocell ("Macro UE"). We assume that a first uplink is set up in the femtocell (from terminal 110 to the "Femto BS" base station 120) and that a second uplink is set up in a neighbouring macrocell (from terminal 130 to the "Macro BS" base station 140). If the terminal 130 is near the border of the macrocell, it will have to emit with high power which will generate severe interference at the femtocell and may make communication between the terminal 110 and the base station 120 impossible. In other words, a ("Macro-UE") user of a macrocell network creates a dead zone 150 surrounding him in the femtocell network.

The scrambling code used on the uplink of the terminal 130 has to be determined to eliminate interference. The literature does not describe any multi-user detection algorithm capable of functioning in blind mode, without knowledge of the scrambling code. Detection in blind mode means that the femtocell base station 120 does not receive any information from the macrocell and particularly the transmission parameters from the different users of the macrocell.

On the other hand, as soon as the scrambling code is known, the signal received from the terminal 130 can be estimated locally and its contribution can be subtracted in the receiver of the terminal 120.

When the macrocell network is of the CDMA 2000 type, determination in blind mode is made even more complex by the fact that each user of this system uses a specific scrambling code. Furthermore, since the signal emitted by the user is spectrally spread, the estimate of the scrambling code must be made at a low signal-to-noise ratio.

One purpose of this invention is to propose a method of estimating a scrambling code used by an uplink of a CDMA 2000 system, for example to eliminate the interference generated in an adjacent femtocell.

PRESENTATION OF THE INVENTION

This invention is defined as a method for estimating a scrambling code used on an uplink of a terminal in a CDMA 2000 system, the signal emitted by the terminal on said link being scrambled using the scrambling code, and then spectrally spread using a spreading code and shaped by means of a shaping filter, this scrambling code being generated by a generator comprising a shift register looped back on itself, in which:
the signal received by the receiver is sampled at twice the chip frequency of the spreading code;
the signal thus sampled is filtered by means of a filter matched to the spreading code and to the shaping filter to obtain a series of samples at said chip frequency;
differential processing of the samples is applied at the output of the matched filter, said differential processing supplying differential values obtained as Hermitian product of samples from said series;
said differential values are iteratively decoded to obtain the content of the shift register of the generator of a first M-sequence representing the sum of two offset versions of the scrambling code;
the content of the shift register of the generator of said first M-sequence is used to determine the content ($a_0^s$) of the shift register of the generator of the scrambling code at a given instant.

Advantageously, it can be checked that the receiver is well synchronised with the scrambling code by:
calculating differential values from the sum of two offset versions of the previously estimated scrambling code;
correlating the differential values at the output from the matched filter with the differential values calculated in the previous step, on a predetermined number of samples;
determining if the result of said correlation is greater than a predetermined threshold.

In the differential processing, differential values may be obtained by $U_{i,j}(k) = y(4k+i+j)y(4k+i)^*$, $i = 0, \ldots, 3$ and $j = i+1, 3$, in which $y(k)$ represents a sample at the output from the matched filter.

The iterative decoding is preferably a decoding by passing belief messages between variable nodes and constraint nodes, said constraints being provided by the polynomial generating the scrambling code.

The content of the scrambling code generator shift register can be obtained by:
using said first M-sequence to determine the content ($a_{Fib}$) of the generator shift register of a second M-sequence in a Fibonacci representation, the first M-sequence being decimated relative to the second M-sequence;
determining the content ($a_{Gal}$) of the shift register of a generator of said second M-sequence using a Galois representation from the content ($a_{Fib}$) of the shift register in the Fibonacci representation;
determining the content ($a_0^s$) of the shift register of the scrambling code generator from the content ($a_{Gal}$) of the shift register of the generator of the second M-sequence according to the Galois representation.

The second M-sequence may be the same generator polynomial as the first M-sequence and the M-sequence may be decimated by a factor of 4 from the second M-sequence.

The content $a_0^s$ of the shift register of the scrambling code generator may be determined from the content $a_{Gal}$ of the shift register of the generator of said second M-sequence according to the Galois representation using $a_0^s = (G^{i+j} + G^i)^{-1} a_{Gal}$ where G is the state transition matrix of the scrambling code generator in the Galois representation and i, j are integers such that $i = 0, \ldots, 3$ and $j = i+1, 3$.

BRIEF DESCRIPTION OF THE DRAWINGS

Other characteristics and advantages of the invention will become clear after reading the embodiments of the invention with reference to the appended drawings among which.

DETAILED PRESENTATION OF PARTICULAR EMBODIMENTS

The basic idea of the invention is to obtain a blind estimate of the scrambling code from a differential multiplication at the output from a filter matched to the transmission channel.

It is worthwhile summarising the processing in a CDMA 2000 emitter before precisely describing this blind estimation method.

Figure 2:
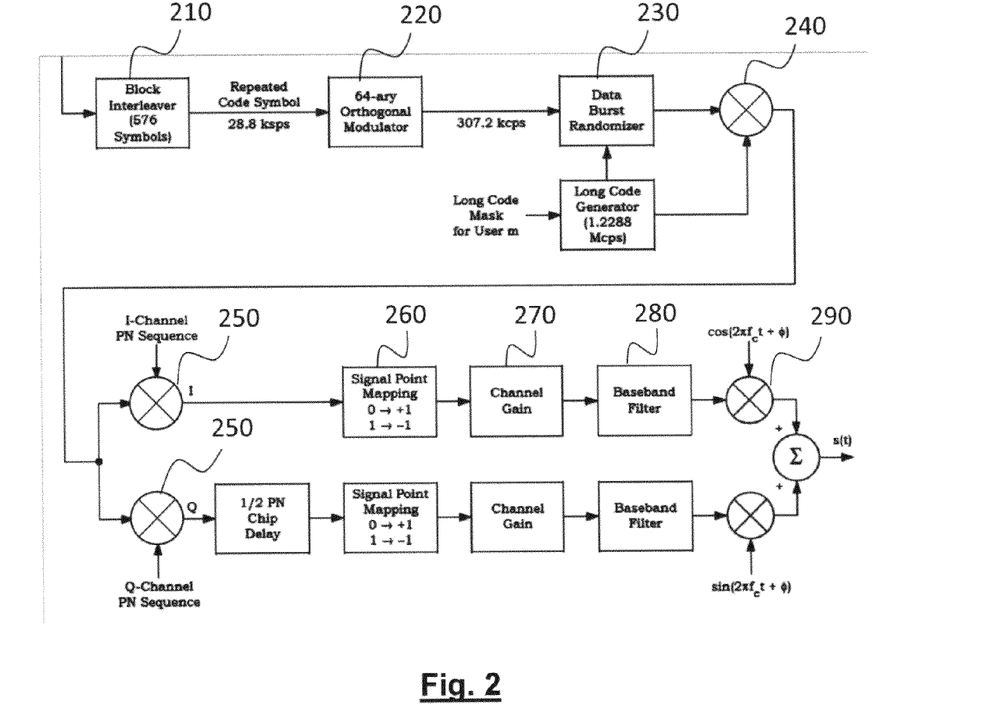
FIG. 2 diagrammatically shows the structure of an emitter of a user of a CDMA 2000 system.

FIG. 2 diagrammatically illustrates the structure of the emitter of a user in a CDMA 2000 system.

After interleaving in 210, a Walsh-Hadamard (W-H) modulation is made on each 6-bit packet in 220. More precisely, there is one W-H sequence at the output from the modulator 220 for each packet. The module 230 performs a pseudo-random masking of the signal as a function of the service throughput. Signal chips are then scrambled using a long code in 240 and are multiplied in phase and in quadrature by spreading sequences in 250. The frequency spread I and Q components are then modulated in 260 by BPSK modulators before being amplified in 270, filtered by a shaping filter in 280, and modulated at the RF frequency in 290.

There is a long code (or scrambling code) specific to each emitter.

Figure 3:
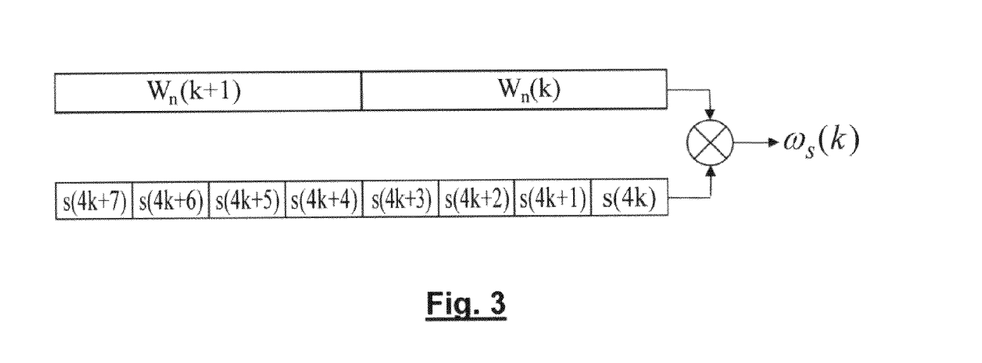
FIG. 3 shows the scrambling mechanism in FIG. 2.

The scrambling mechanism is shown in detail in FIG. 3. The chips in the W-H sequence corresponding to the symbol (6-bit packet) to be emitted are replicated by a factor of 4, in other words each chip $W_n(k)$ in the user sequence n is successively multiplied (in 310) by 4 elements of the scrambling code, $s(4k)$, $s(4k+1)$, $s(4k+2)$, $s(4k+3)$ to provide the scrambled sequence $\omega_s(k)$.

The scrambling code (or long code) itself is obtained from a maximum length sequence, also called M-sequence. Note that such a sequence may be generated by means of a shift register looped back on itself, for which the taps correspond to the coefficients of a primitive polynomial. If the degree of this polynomial is q, the period of the M-sequence is $2^q-1$.

Figure 4:
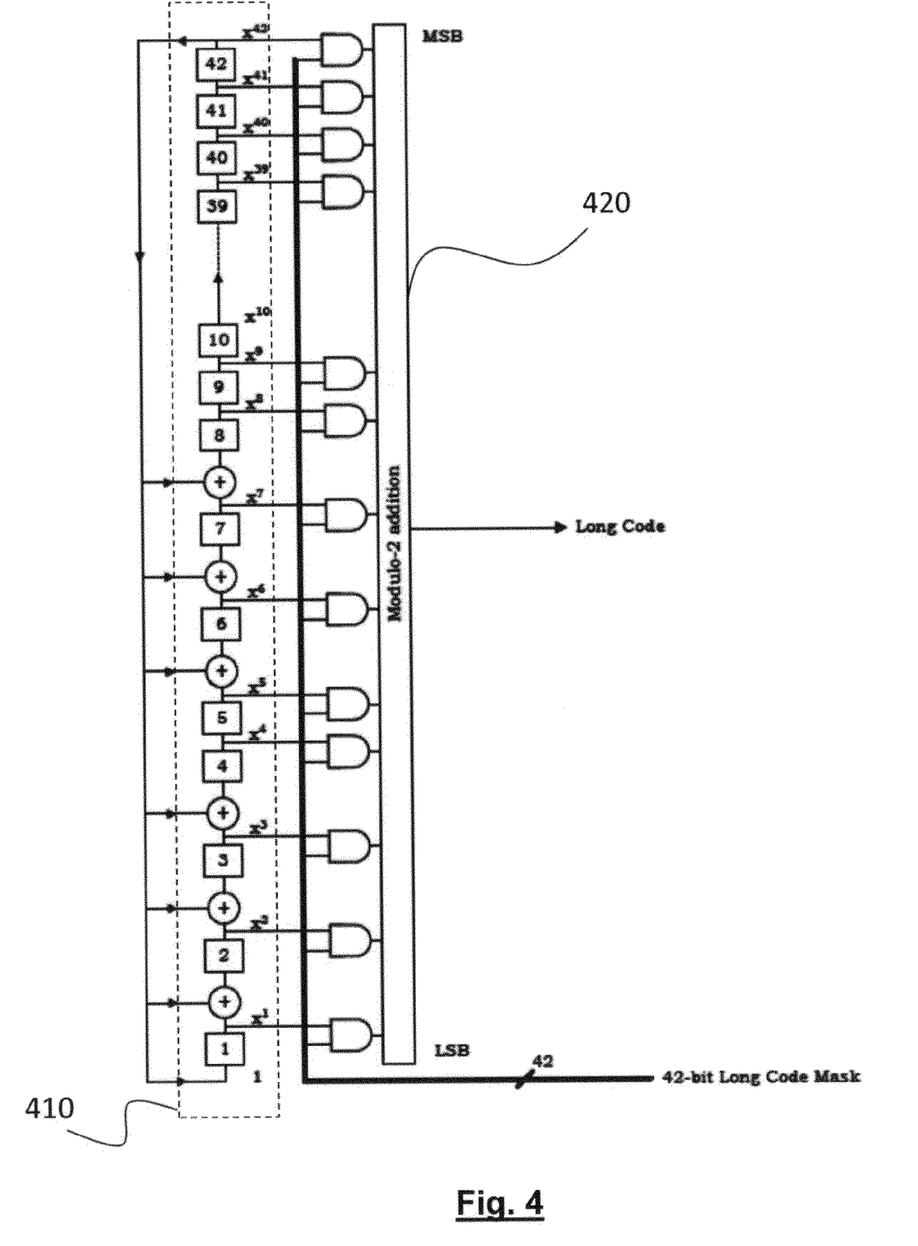
FIG. 4 shows a scrambling code generator.

FIG. 4 diagrammatically shows the structure of a long code generator for a CDMA 2000 system. The generator comprises a shift register 410 (with 42 stages), looped back on itself, the taps of which correspond to the powers of the generating polynomial:

$$g(x) = x^{42} + x^{41} + x^{40} + x^{39} + x^{37} + x^{36} + x^{35} + x^{32} + x^{26} + x^{25} + \quad (1)$$
$$x^{24} + x^{23} + x^{21} + x^{20} + x^{17} + x^{16} + x^{15} + x^{11} + x^9 + x^7 + 1$$

The values supplied by the stages of the register are masked by means of a logical AND with a 42-bit binary mask and the values thus masked are added modulo 2, in 420. Thus, the summator 420 supplies a new bit at each offset of the register. The sequence of bits provided by the summator gives the scrambling code.

The output from the summator 420 can be expressed as follows:

$$s(k) = \sum_{i=0}^{r-1} m(i)s_0(k+i) \quad (2)$$

where $s_0(k)$ is the M-sequence if there is no masking, k is a time index, i is the rank of the stage in the register and m(i), i=0, . . . , r−1 (r=42 in the CDMA2000 system) is the binary mask specific to the user.

It can be shown that if $s_0(k)$ is an M-sequence then $s_0(k) \oplus s_0(k+n)$, in other words the sum of two offset versions of the same sequence is also an M-sequence of the same generating polynomial. It can be deduced that s(k) given by expression (2) is still an M-sequence of the same generating polynomial but corresponding to a different initial state of the shift register.

In the following, we will consider the scenario shown in FIG. 2 when the macrocell system is of the CDMA2000 type.

We will assume that the receiver of the base station 120 in the femtocell network is synchronised with the macrocell. In practice, it is possible to determine the beginning of each frame by means of the pilot channel (on which a spectrally spread pilot is transmitted) and adjusting relative to a time reference using the Synchronization Channel Message message (which provides the offset of the spreading code at a precise instant Sys-Time). This time reference is the clock reference derived from the GPS system.

The detail of the synchronisation mechanism is described in document 3GPP2 CS002-A entitled "Physical Layer Standard for CDMA2000 Spread Spectrum Systems—Release A", Jun. 9, 2000, available on the MI site. In the following it is assumed that the base station receiver is synchronised with the beginning of the frame.

It is also assumed that the receiver knows the spreading sequences and the polynomial generating the scrambling code. On the other hand, the receiver does not know a priori the binary mask used by the terminal 130 and therefore its scrambling code.

The signal received by the base station 120 from the terminal 130 can be expressed as follows:

$$r(k) = (H_1 I + jH_2 Q)e + \eta(k) \quad (3)$$

where e is the chip vector, before spectral spreading, in other words the product of W-H sequences by the scrambling code, I and Q are diagonal matrices, the elements of which are the spreading sequences in phase and quadrature respectively, and $H_1$, $H_2$ are matrices modelling shaping of the channels in phase and in quadrature (with an over sampling factor equal to 2) and $\eta(k)$ is a noise sample on the channel assumed to be Additive Gaussian (AWGN).

The received signal r(k) is firstly filtered by means of a filter matched to the spreading code, to the pulse shaping (filtering 280 in FIG. 2). The filtering in question performs a decimate by a factor of 2. More precisely, by setting $H_0 = H_1 I + jH_2 Q$, the emitted signal e is estimated by application of a pseudo-inverse matrix $H_0^\dagger$. The signal e, at the output from the matched filter can then be expressed in the following form:

$$y(k) = e^{j\theta} S(k) W_n\left(\left\lfloor \frac{k}{4} \right\rfloor\right) + n(k) \quad (4)$$

where θ is the phase shift introduced by the channel, S(k) is the chip of the scrambling code generated at time $kT_c$ (where $T_c$ the chip period of the W-H sequences), $W_n(i)$ is the $i^{th}$ chip of the $n^{th}$ Walsh-Hadamard sequence, $\lfloor x \rfloor$ designates the integer value of x and n(k) is a noise sample assumed to be white, Gaussian, centred and with variance $\sigma^2$.

Due to the repetition of the symbols in the W-H sequence in scrambling, the following relations are obtained as explained above in relation to FIG. 3:

$$y(4k)=e^{i\theta}S(4k)W_n(k)+n(4k)$$

$$y(4k+1)=e^{i\theta}S(4k+1)W_n(k)+n(4k+1)$$

$$y(4k+2)=e^{i\theta}S(4k+2)W_n(k)+n(4k+2)$$

$$y(4k+3)=e^{i\theta}S(4k+3)W_n(k)+n(4k+3) \quad (5)$$

The result is thus a series of four samples y(4k+i), i=0, ..., 3 at the output from the matched filter corresponding to a single chip $W_n(k)$ in the W-H sequence.

Differential processing is then applied on this series of samples. More precisely, this processing consists of calculating the Hermitian product of two samples in the series, namely, setting $U_{i,j}(k)=y(4k+i+j)y(4k+i)^*$:

$$U_{i,j}(k)=S(4k+i+j).S(4k+i)+S(4k+i+j)e^{i\theta}W_n(k)n(4k+i)^*+$$
$$S(4k+i)e^{i\theta}W_n(k)n(4k+i+j)^*+n(4k+i+j)n(4k+i)^* \quad (6)$$

In other words, if the last three noise terms are grouped together in the form of a noise sample $v_{i,j}(k)$:

$$U_{i,j}(k)=S(4k+i+j).S(4k+i)+v_{i,j}(k) \quad (7)$$

The result obtained is thus differential values $U_{i,j}(k)$, i=0, ..., 3, j=i+1, ..., 3, that then only depend on the scrambling code and not on the W-H sequence emitted by the user 130 or the phase shift introduced by the channel.

Chip S(k)=±1 in the scrambling code is related to bit s(k) in this code by S(k)=2s(k)−1. Setting $X_{ij}(k)=S(4k+i+j)S(4k+i)$ and $x_{ij}=(1+X_{ij}(4k))/2$, we obtain:

$$x_{ij}(4k)=s(4k+i+j)+s(4k+i) \quad (8)$$

obviously, the addition being binary.

Therefore, for given values of i, j, the $x_{ij}(4k)$ sequence is the sum of two M-sequences decimated by a factor of 4 and offset (by j bits).

Considering that decimation of an M-sequence by a power of 2 is nothing more than an offset version of this sequence and that the sum of two offset versions of a single M-sequence gives an offset version of this sequence, it can be understood that for a given pair (i, j), $x_{ij}(4k)$ is an M-sequence with the same generating polynomial as s(k), presenting, at a given time, a different content of the shift register.

Figure 5:
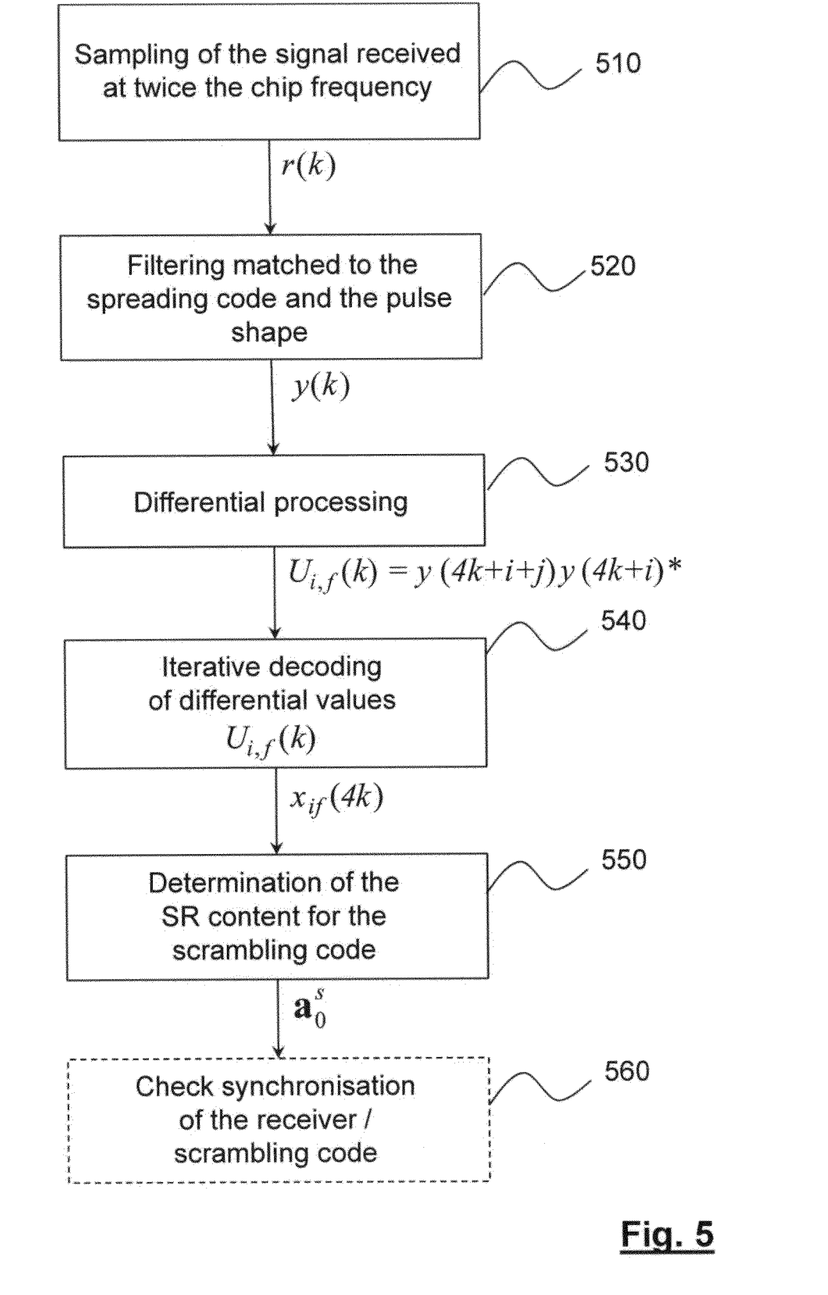
FIG. 5 diagrammatically shows the method of estimating a scrambling code according to one embodiment of the invention.

Having made these clarifications, we will describe FIG. 5 that diagrammatically shows a method of estimating the scrambling code according to one embodiment of the invention.

In step 510, the received signal is sampled at twice the chip frequency $1/T_c$, of the spreading codes used in the cell of the CDMA 2000 macrocell network.

In step 520, the signal received r(k) (by the receiver in the femtocell base station 120) is filtered by filtering matched to the spreading code, to shaping of pulses and possibly to the channel transfer function. A sampled filtered signal y(k) is obtained at the chip frequency of the scrambling code as explained above.

In step 530, a differential processing of samples of the filtered signal is applied corresponding to the same symbol in a W-H sequence emitted by the user. The result obtained is differential values $U_{ij}(k)$ as stated above. The calculation may be made for one or several pairs or even all pairs (i, j), i=0, ..., 3, j=i+1, ..., 3.

Steps 510 to 530 have already been described and therefore will not be repeated in detail herein.

At step 540, differential values $U_{i,j}(k)$, i=0, ..., 3, j=i+1, ..., 3 output from the previous step are iteratively decoded to obtain the $X_{i,j}(k)$ sequences. Considering that the bit sequence $x_{ij}(4k)$ is an M-sequence obtained by the generating polynomial g(x) given by (1), it can be decoded using a belief propagation decoding algorithm as described for example in the article by K. M. Chugg and M. Zhu entitled "A New Approach to Rapid PN Code Acquisition Using Iterative Message Passing Techniques", IEEE Journal on Selected Areas in Communications, vol. 25, no. 5, May 2005. A generating polynomial maximum sequence generator:

$$g(x)=g_0+g_1x+\ldots+g_rx^r \quad (9)$$

can be seen as a parity matrix encoder with size (M−r)×M:

$$H_{LFSR} = \begin{pmatrix} g_r & g_{r-1} & \cdots & g_1 & g_0 & 0 & 0 & 0 & \cdots & 0 \\ 0 & g_r & g_{r-1} & \ddots & g_1 & g_0 & 0 & 0 & \cdots & 0 \\ \vdots & \ddots & \ddots & \ddots & \ddots & \ddots & \ddots & \ddots & \ddots & 0 \\ 0 & 0 & \cdots & g_r & g_{r-1} & \cdots & g_1 & g_0 & \cdots & 0 \end{pmatrix} \quad (10)$$

where M is the number of successive bits considered at the output from the generator. This parity matrix reflects constraints between bits in the M-sequence, and the encoder, like LDPC encoders, may be represented by a sequence of variable nodes and a sequence of constraint nodes. Decoding is then carried out iteratively, by passing messages between the variable nodes and the constraint nodes.

In this case, the observable values are values $U_{i,j}(k)$. The algorithm can be used to estimate at each iteration soft values (for example log-likelihood ratios LLRs) of the bits $x_{ij}(4k)$. The bits $x_{ij}(4k)$ are then obtained by means of a hard decision on these LLRs.

At step 550, the content of the shift register for the scrambling code s(k) is deduced from the previous step. This content is a 42 bit word $a_0^s=(a_0^s, a_1^s, \ldots, a_{r-1}^s)^T$ (where r=42) that univocally defines the code.

Figure 6:
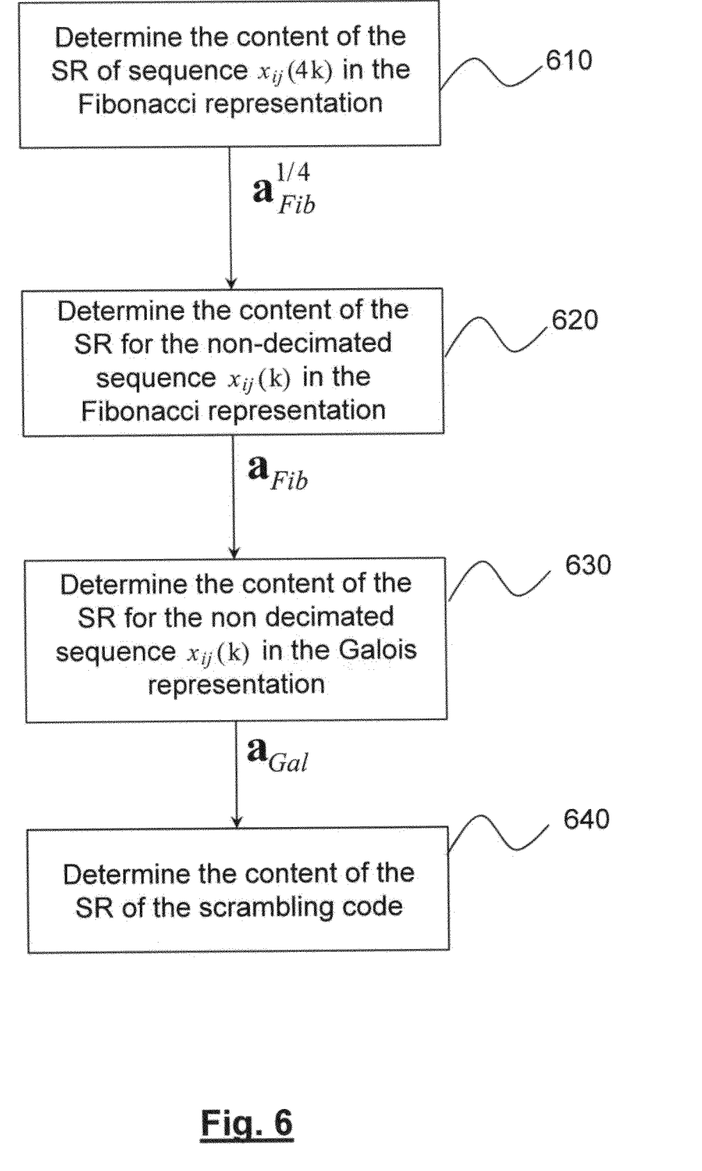
FIG. 6 diagrammatically shows an embodiment of the step to estimate the register of the scrambling code generator.

FIG. 6 diagrammatically shows the detail of step 550 according to one embodiment of the invention.

The content of the shift register of the M-sequence generator $x_{ij}(4k)$ is determined at the beginning of the frame in step 610. Due to the connection between the stages of the register in Fibonacci representation, the content of the shift register is the word formed by $x_{ij}(4k)$, k=0, ..., 41.

The content of the shift register of the non-decimated M-sequence generator $x_{ij}(k)$ is determined starting from the content of this shift register. Note that the decimated sequence $x_{ij}(4k)$ has the same generator polynomial as the original sequence $x_{ij}(k)$, but has a different register content at a given reference time.

Figure 7A:
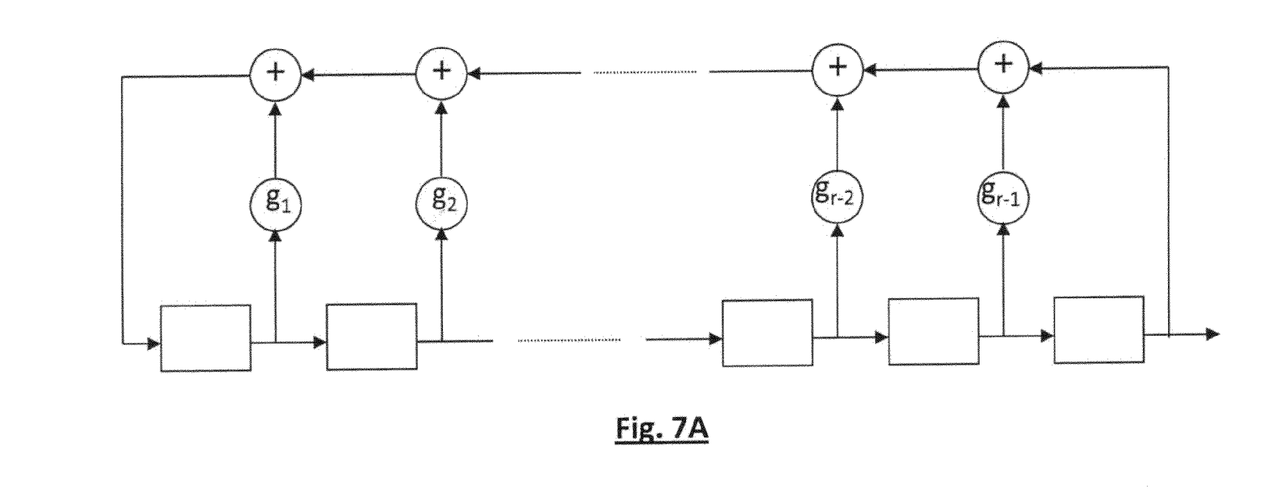
FIGS. 7A and 7B show the structure of the same generator of an M-sequence in a Fibonacci representation and a Galois representation respectively.

The content of the shift register for the decimated sequence may be obtained in a Fibonacci representation of the generator as shown in FIG. 7A. The Galois representation of the same generator (previously used in FIG. 4) is given in FIG. 7B. The content of the register in the Fibonacci representation may be obtained using the method described in the article by B. Arazi entitled "Decimation of m-sequences leading to any desired phase shift", published in Electronics Letters, Vol. 13, No. 7, March 1977.

More precisely, denoting $a_{Fib}^{1/4}$ the vector of size r=42 giving the content of the shift register in the Fibonacci representation of the sequence generator $x_{ij}(4k)$, and $a_{Fib}$ the content of the shift register for the decimated sequence $x_{ij}(k)$ we obtain $$a_{Fib}=T_{undecim}^{1/2}T_{undecim}^{1/2}a_{Fib}^{1/4} \quad (11)$$

in which $T_{undecim}^{1/2}$ is a matrix of size r×r giving the state change between the decimated sequence and the original sequence, for a decimation by a factor of ½.

Matrix $T_{undecim}^{1/2}$ may be obtained using the method described in detail in the article mentioned above. The first step to achieve this is to calculate the root of the inverted polynomial $a^{-1}$ of the generating polynomial $(g^{-1}(x) = g(x)x^{-r})$ of the non-decimated sequence, $T_{undecim}^{1/2}$ is then the binary matrix of which the $i^{th}$ line is given by the decomposition coefficients $a_{ik}$:

$$\alpha^{-ip} = \sum_{k=0}^{r} a_{i,k} \alpha^{-k} \quad (12)$$

where p is an integer satisfying the congruence relation $2p \equiv 1 \mod (2^r-1)$, for example $p=2^{r-1}$.

It can be shown that the following relations are satisfied for even lines and odd lines respectively:

$$\alpha^{-2ip} = \alpha^{-i} \quad (13\text{-}1)$$

$$\alpha^{-(2i+1)p} = \alpha^{-p-i} \quad (13\text{-}2)$$

The even lines in the $T_{undecim}^{1/2}$ matrix are obtained directly from (12) and (13-1). For odd lines, the remainder of the polynomial division of $a^{-p-i}$ by the inverse polynomial $g^{-1}$ is calculated, namely:

$$\alpha^{-p-i} = \sum_{k=0}^{r-1} c_{i,k} \alpha^{-k} \quad (14)$$

The odd line 2i+1 is then given by coefficients $c_{i,k}$ by virtue of (12), (13-2) and (14).

Finally, the content of the shift register $a_{Fib}$ is obtained for the non-decimated sequence.

At step 630, the content of the shift register in the Galois representation is determined from the content of the shift register in the Fibonacci representation.

Figure 7B:
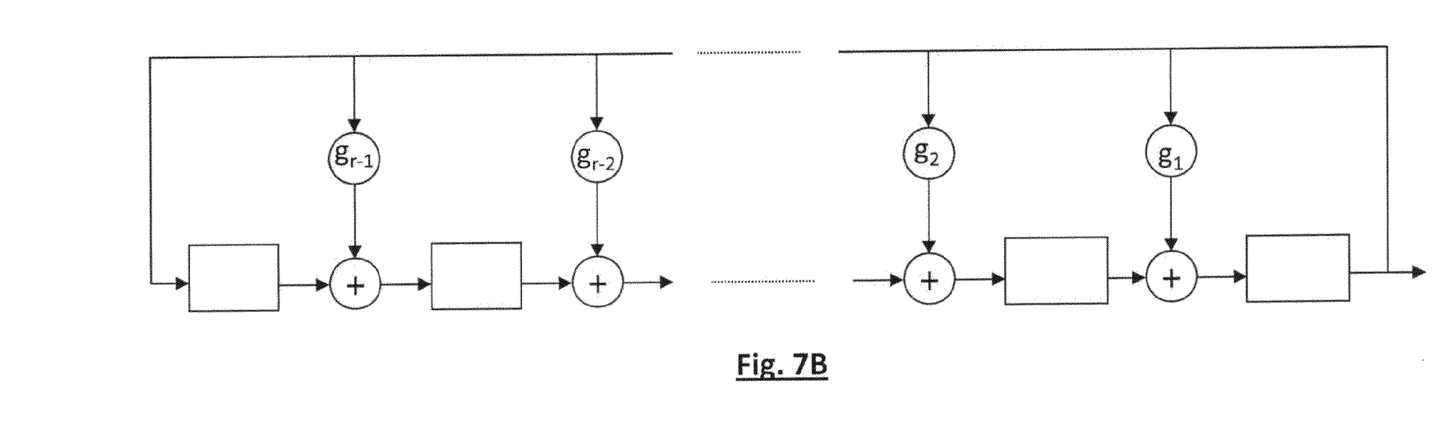

In general, if the content of the shift register in the Fibonacci representation is denoted $a_{Fib}$ and the content of the shift register in the Galois representation is denoted $a_{Gal}$ and if the Fibonacci representation to Galois representation state transposition matrix is denoted $T^{GF}$ we obtain:

$$a_{Gal} = T^{GF} a_{Fib} \quad (15)$$

in which the elements of the transposition matrix are given as follows, using the notation conventions given in FIGS. 7A and 7B:

$$T_{ij}^{GF} = g(i-j) \text{ if } j \leq i \text{ and } T_{ij}^{GF} = 0 \text{ else} \quad (16)$$

Note that for the CDMA 2000 system, the order of stages in the shift register is the inverse of the order in FIGS. 7A and 7B.

In other words, if I is the set of indexes defined by {7,9,11, 15,16,17,20,21,23,24,25,26,32,35,36,37,39,40,41,42}, $g(q)=1$ if $q \in I$ and $g(i)=0$ otherwise.

At step 640, the content of the shift register $a_0^s = (a_0^s, \ldots, a_{r-1}^s)^T$ of the scrambling code generator s(k) is determined. Note that after decimation of the differential values, we have:

$$x_{ij}(k) = s(k+i+j) + s(k+i) \quad (17)$$

for $i=0, \ldots, 3$ and $j=i+1, \ldots, 3$.

Therefore, the M-sequence $x_{ij}(k)$ is a delayed version of the M-sequence s(k).

If the state transition matrix for the sequence generator s(k) in the Galois representation is denoted G, that is, using the conventions in FIG. 7A, (g(q)=1 if $q \in I$ and g(q)=0 otherwise):

$$G = \begin{bmatrix} g_1 & 1 & 0 & 0 & \ldots & 0 \\ g_2 & 0 & 1 & 0 & \ldots & 0 \\ g_3 & 0 & 0 & 1 & \ldots & 0 \\ \vdots & \vdots & & & \ldots & \vdots \\ g_{r-1} & 0 & 0 & 0 & \ldots & 1 \\ g_r & 0 & 0 & 0 & \ldots & 0 \end{bmatrix} \quad (18)$$

The content of the sequence register s(k+i), denoted $a_i^s$, is deduced from the content of the sequence s(k), $a_0^s$, by applying the state change matrix i times, namely $a_i^s = G^i a_0^s$ and therefore according to (17):

$$a_{Gal} = (G^{i+j} + G^i) a_0^S \quad (19)$$

The vector $a_{Gal}$ is calculated for the pair(s) (i, j), $i=0, \ldots, 3$, $j=i+1, \ldots, 3$ taken into account the differential calculation.

Consequently, the content of the offset generator generating the scrambling code is given by:

$$a_0^S = (G^{i+j} + G^i)^{-1} a_{Gal} = (G^{i+j} + G^i)^{-1} T^{GF} T_{undecim}^{1/2} T_{undecim}^{1/2} a_{Fib}^{1/4} \quad (20)$$

Returning to FIG. 5, in 560 it may optionally be checked if the base station receiver 120 is well synchronised with the scrambling code of the terminal 130. More precisely, this synchronisation is obtained when the sample y(4k) at the output from the matched filter coincides with bit s(4k) of the scrambling code. The time position of each chip in the W-H sequence is then known.

We recall that, in step 530, the differential values $U_{i,j}(k) = y(4k+i+j)y(4k+i)^*$ are obtained from the output from the matched filter. These differential values are qualified as "observed".

Once the content $a_0^S$ of the shift register of the scrambling code generator has been estimated in step 550, the sequence s(k) can be generated from this state and therefore the sequences S(4k+i+j) and S(4k+i) can also be generated.

The next step is to calculate differential values $X_{ij}(k) = S(4k+i+j)S(4k+i)$ corresponding to sequence s(k).

The differential values observed are then correlated with the calculated differential values, namely:

$$V = \sum_{i,j} \sum_{k=0}^{L} U_{i,j}(k) \cdot X_{i,j}(4k), \quad (21)$$

The correlation being made on a sequence of L samples each time.

The result of the correlation V is compared with a predetermined threshold λ.

If V>λ, it is concluded that the receiver is well synchronised with the scrambling code. Otherwise, the receiver is not synchronised.

Knowing the scrambling code and the spreading code of the terminal 130, the receiver of the base station 120 can estimate symbols emitted by the terminal, namely 6-bit packets encoded by the W-H sequences. It can then regenerate the contribution to the received signal output from this terminal using the scrambling code, the spreading code, the shaping filter and the pulse response of the channel. This contribution is then subtracted from the received signal in a manner known as such, to eliminate interference due to the terminal 130. If necessary, this operation may be repeated in parallel or in series to eliminate interference of several users of the CDMA 2000 macrocell system.

The invention claimed is:

1. A method of estimating a scrambling code used on an uplink of a CDMA 2000 system, a signal emitted by a terminal on said uplink being scrambled using the scrambling code, and then spectrally spread using a spreading code and shaped with a shaping filter, said scrambling code being generated by a generator comprising a shift register looped back on itself, said method comprising:
   sampling the signal received by a receiver at twice a chip frequency of the spreading code;
   filtering the signal thus sampled with a filter matched to the spreading code and to the shaping filter to obtain a series of samples at said chip frequency;
   applying differential processing on the samples at an output of the matched filter, said differential processing supplying differential values obtained as Hermitian product of samples from said series;
   decoding iteratively said differential values to obtain a content of values stored in the shift register of the generator of a first maximum length sequence (M-sequence) representing a sum of two offset versions of the scrambling code; and
   determining, using the content of values stored in the shift register of the generator of said first M-sequence, a content ($a_0^s$) of the shift register of the scrambling code generator at a given instant.

2. The method of estimating the scrambling code according to claim 1, further comprising checking that the receiver is well synchronized with the scrambling code by:
   calculating differential values from the sum of two offset versions of a previously estimated scrambling code;
   correlating the differential values at the output from the matched filter with the differential values calculated in the previous step, on a predetermined number of samples;
   determining if the result of said correlation is greater than a predetermined threshold.

3. The method of estimating the scrambling code according to claim 1, wherein, in the differential processing, differential values are obtained by $U_{i,j}(k)=y(4k+i+j)y(4k+i)^*$, $i=0, \ldots, 3$ and $j=i+1, 3$, in which $y(k)$ represents a sample at the output from the matched filter.

4. The method of estimating the scrambling code according to claim 1, wherein said iterative decoding is performed by passing belief messages between variable nodes and constraint nodes, said constraints being provided by a polynomial generating the scrambling code.

5. The method of estimating the scrambling code according to claim 4, wherein the content of values stored in the shift register of the scrambling code generator is obtained by:
   using said first M-sequence to determine a content ($a_{Fib}$) of values stored in the shift register of the generator of a second M-sequence in a Fibonacci representation, the first M-sequence being decimated relative to the second M-sequence;
   determining a content ($a_{Gal}$) of values stored in the shift register of the generator of said second M-sequence using a Galois representation from the content ($a_{Fib}$) of values stored in the shift register in the Fibonacci representation;
   determining the content ($a_0^s$) of values stored in the shift register of the scrambling code generator from the content ($a_{Gal}$) of values stored in the shift register of the generator of the second M-sequence according to the Galois representation.

6. The method of estimating the scrambling code according to claim 5, wherein the second M-sequence has a same generator polynomial as the first M-sequence and the first M-sequence is decimated by a factor of 4 from the second M-sequence.

7. The method of estimating the scrambling code according to claim 5, wherein the content $a_0^s$ of values stored in the shift register of the scrambling code generator is determined from the content $a_{Gal}$ of values stored in the shift register of the generator of said second M-sequence according to the Galois representation by using $a_0^S=(G^{i+j}+G^i)^{-1}a_{Gal}$ where G is a state transition matrix of the scrambling code generator in the Galois representation and i, j are integers such that $i=0, \ldots, 3$ and $j=i+1, 3$.

* * * * *